T. L. WEST.
Fruit Drier.
No. 43,058.
Patented June 7, 1864.
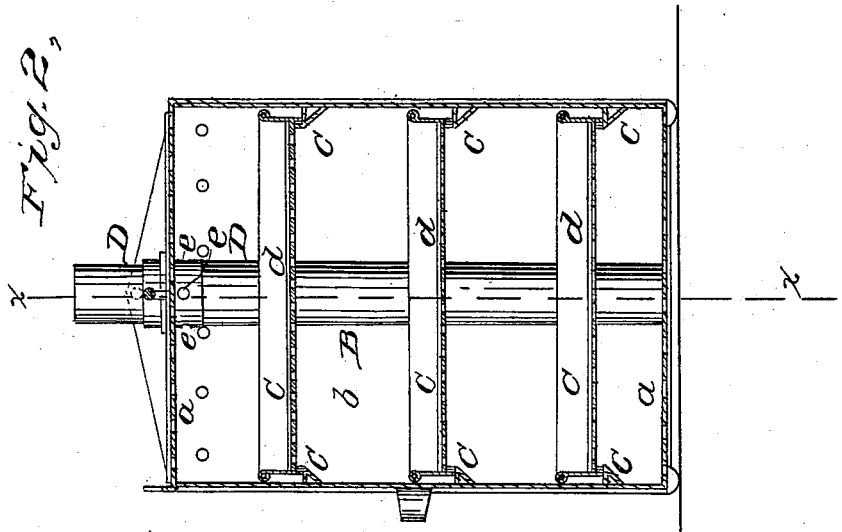
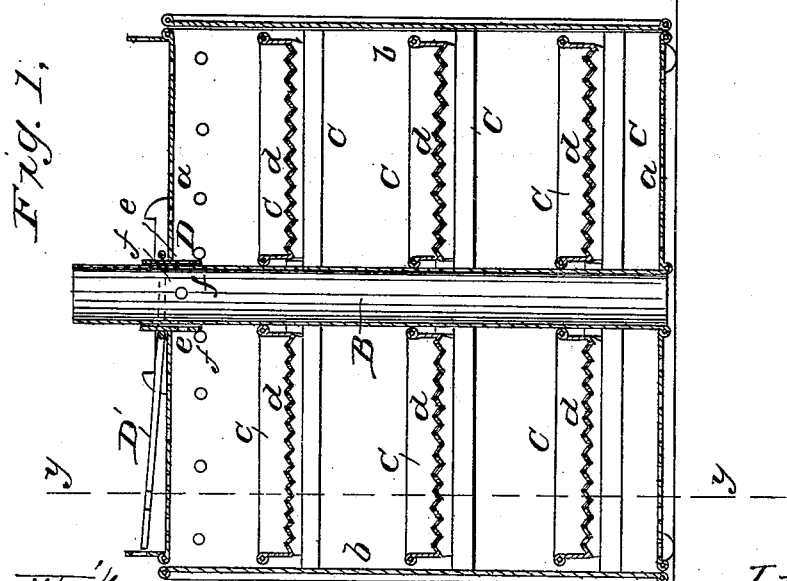

UNITED STATES PATENT OFFICE.

THOMAS L. WEST, OF WEST SALEM, WISCONSIN.

IMPROVEMENT IN FRUIT-DRIERS.

Specification forming part of Letters Patent No. 43,058, dated June 7, 1864.

*To all whom it may concern:*

Be it known that I, THOMAS L. WEST, of West Salem, in the county of La Crosse and State of Wisconsin, have invented a new and Improved Device for Drying Fruit; and I do hereby declare that the following is a full, clear, and exact description of the same, reference being had to the accompanying drawings, making a part of this specification, in which—

Figure 1 is a vertical section of my invention, taken in the line $x\ x$, Fig. 2; Fig. 2, a vertical section of the same, taken in the line $y\ y$, Fig. 1.

Similar letters of reference indicate corresponding parts in the two figures.

This invention relates to a new and useful device for drying fruit by artificial or stove heat, and which may be applied to the pipe of any ordinary stove or heater.

The invention consists of a box, of rectangular or other suitable form, perforated at its upper and lower part, and containing a series of perforated shelves or trays to receive the fruit, the box having a pipe running centrally through it, to which the pipe of the stove or heater is connected, the box-pipe being provided with a register, and all arranged as hereinafter fully shown and described, whereby a very simple, efficient, and economical device for the purpose specified is obtained.

To enable those skilled in the art to fully understand and construct my invention, I will proceed to describe it.

A represents a rectangular box or case, which may be constructed of sheet metal and of any suitable dimensions, and perforated at its top and bottom, as shown at $a\ a$. The ends of this box are provided with doors $b$, and B is a vertical pipe which passes centrally through the box, the latter being firmly attached to the former. Within this box A at each side there are attached horizontal cleats $c$, to receive shelves or trays C, which may also be constructed of sheet metal. The bottoms of these shelves or trays are corrugated and perforated, as shown at $d$, and any suitable number of them may be employed. On the upper part of the pipe B there is placed a tube, D, which is perforated with holes $e$, and which works over holes $f$ in the pipe B. This tube D forms a register by which, when necessary, communication may be had with the box A and the interior of the pipe B. This tube D has a lever, D', attached to it above the box A for the convenience of turning it. The pipe B has the pipe of the stove or heater connected to its upper and lower ends, and the fruit to be dried is placed on the shelves or trays C. The box is heated from the pipe B, and a circulation of air, owing to the perforations at its top and bottom, is allowed to pass through the box and through the fruit, carrying off the moisture eliminated therefrom, and this moisture, when excessive, may be allowed to pass into the pipe B by opening the register previously described. The shelves or trays may be readily inserted in and removed from the box A through the doors $b$.

Having thus described my invention, what I claim as new, and desire to secure by Letters Patent, is—

1. The box or case A, perforated at its upper and lower ends, and provided with a central tube, B, either with or without a register, to communicate with the pipe of a stove or heater, substantially as and for the purpose set forth.

2. The shelves or trays C, fitted in the box A, and provided with the corrugated perforated bottoms $d$, substantially as and for the purpose specified.

THOMAS L. WEST.

Witnesses:
JUDSON WEST,
V. B. CLARK.